US008027168B2

(12) United States Patent  (10) Patent No.: US 8,027,168 B2
Senk et al.  (45) Date of Patent: Sep. 27, 2011

(54) ELECTRICAL CENTER WITH VERTICAL POWER BUS BAR

(75) Inventors: Joseph Matthew Senk, Cortland, OH (US); Joseph Howard Gladd, Cortland, OH (US); Gino M. Roncone, Pelham, AL (US); John B. Kirk, Canfield, OH (US)

(73) Assignee: Delphi Technologies, Inc., Troy, MI (US)

( * ) Notice: Subject to any disclaimer, the term of this patent is extended or adjusted under 35 U.S.C. 154(b) by 471 days.

(21) Appl. No.: 12/228,446

(22) Filed: Aug. 13, 2008

(65) Prior Publication Data

US 2010/0038133 A1 Feb. 18, 2010

(51) Int. Cl.
*H05K 5/00* (2006.01)

(52) U.S. Cl. ........ 361/755; 361/601; 361/622; 361/624; 361/648; 361/704; 361/730; 361/775; 361/796; 174/72 B; 174/387; 174/390; 439/55; 439/62; 439/76.2; 439/78; 439/81; 439/213; 439/516; 439/786; 257/691

(58) Field of Classification Search .................. 361/755, 361/601, 622, 624, 648, 704, 730, 775; 174/387, 174/390, 541; 439/55, 62, 786.1, 76.2, 78, 439/516, 716; 257/691
See application file for complete search history.

(56) References Cited

U.S. PATENT DOCUMENTS

| | | | |
|---|---|---|---|
| 4,405,189 A * | 9/1983 | Douty et al. ............... 439/62 |
| 4,412,255 A * | 10/1983 | Kuhlman et al. .......... 348/819 |
| 4,639,864 A * | 1/1987 | Katzman et al. ........... 714/14 |
| 4,695,923 A * | 9/1987 | Abraham .................. 361/648 |
| 4,912,597 A * | 3/1990 | Carpenter et al. .......... 361/329 |
| 4,925,392 A * | 5/1990 | Himes et al. .............. 439/55 |
| 4,930,045 A * | 5/1990 | Carlson et al. ............. 361/329 |
| 5,023,752 A | 6/1991 | Detter et al. |
| 5,214,564 A * | 5/1993 | Metzler et al. ............. 361/699 |
| 5,651,702 A * | 7/1997 | Hanning et al. ............ 439/715 |
| 5,831,814 A | 11/1998 | Hamill |
| 5,866,848 A * | 2/1999 | Asselta et al. ............. 174/72 B |
| 5,890,934 A * | 4/1999 | Brooks et al. .............. 439/716 |
| 5,901,038 A * | 5/1999 | Cheng et al. ............... 361/704 |
| 5,959,848 A * | 9/1999 | Groves et al. .............. 361/809 |
| 6,051,782 A * | 4/2000 | Wagner .................... 174/541 |
| 6,077,102 A | 6/2000 | Borzi et al. |
| 6,144,561 A * | 11/2000 | Cannella et al. ........... 361/796 |
| 6,160,696 A * | 12/2000 | Bailey et al. ............... 361/115 |
| 6,171,140 B1 * | 1/2001 | Anbo et al. ................ 439/516 |
| 6,238,225 B1 * | 5/2001 | Middlehurst et al. ........ 439/212 |
| 6,264,017 B1 * | 7/2001 | Evans ....................... 191/23 A |
| 6,313,991 B1 * | 11/2001 | Nagashima et al. ........ 361/699 |
| 6,325,640 B1 * | 12/2001 | Kasai ....................... 439/76.2 |
| 6,371,811 B1 | 4/2002 | Chen et al. |

(Continued)

*Primary Examiner* — Xiaoliang Chen
(74) *Attorney, Agent, or Firm* — Thomas N. Twomey

(57) ABSTRACT

An electrical assembly comprises a mounting bracket lift assembly and an electrical center. The electrical center is attached to the mounting bracket lift assembly for plugging wiring harness end connectors into the electrical center. The electrical center comprises a lower housing, a circuit board sub-assembly, an upper housing, electrical components such as fuses and relays that plug into the upper housing and a cover. The circuit board sub-assembly includes a power bus bar that provides a power path for the various electrical circuits of the vehicle via the circuit components carried on the circuit board. Three power bus bars that are configured, oriented and located to reduce the foot print of the electrical center and/or to improve the dissipation of heat generated by the electrical center are disclosed.

24 Claims, 6 Drawing Sheets

U.S. PATENT DOCUMENTS

| | | | |
|---|---|---|---|
| 6,404,628 B1 * | 6/2002 | Nagashima et al. | 361/690 |
| 6,444,931 B1 * | 9/2002 | Bartek et al. | 200/307 |
| 6,445,571 B1 * | 9/2002 | Inniss et al. | 361/624 |
| 6,466,451 B2 | 10/2002 | Mizuno et al. | |
| 6,600,658 B2 | 7/2003 | Iwata | |
| 6,603,075 B1 | 8/2003 | Soares et al. | |
| 6,655,967 B2 * | 12/2003 | Oda | 439/76.2 |
| 6,734,663 B2 * | 5/2004 | Fye et al. | 324/142 |
| 6,845,017 B2 * | 1/2005 | Ahmed et al. | 361/775 |
| 6,965,517 B2 | 11/2005 | Wanes et al. | |
| 6,987,656 B2 | 1/2006 | Nakamura et al. | |
| 7,215,555 B2 | 5/2007 | Takagi | |
| 2001/0026430 A1 | 10/2001 | Onizuka et al. | |
| 2001/0051450 A1 * | 12/2001 | Ross | 439/78 |
| 2002/0002961 A1 * | 1/2002 | Yuasa et al. | 123/198 R |
| 2002/0031951 A1 * | 3/2002 | Coyle et al. | 439/630 |
| 2003/0089970 A1 * | 5/2003 | Gates et al. | 257/678 |
| 2003/0096518 A1 * | 5/2003 | Tsai | 439/81 |
| 2003/0123205 A1 * | 7/2003 | Ashiya | 361/93.1 |
| 2003/0200761 A1 * | 10/2003 | Funahashi et al. | 62/228.4 |
| 2004/0001319 A1 | 1/2004 | Kawakita et al. | |
| 2004/0033100 A1 * | 2/2004 | Richtsmeier et al. | 400/692 |
| 2004/0112624 A1 * | 6/2004 | Kubota | 174/59 |
| 2004/0145860 A1 * | 7/2004 | Shindo | 361/622 |
| 2004/0160731 A1 * | 8/2004 | Yamaguchi | 361/600 |
| 2006/0036362 A1 * | 2/2006 | Ikeda et al. | 701/105 |
| 2006/0040526 A1 * | 2/2006 | Shirota | 439/76.2 |
| 2006/0040538 A1 * | 2/2006 | Wiant et al. | 439/213 |
| 2007/0045037 A1 * | 3/2007 | Yoshinari et al. | 180/444 |
| 2007/0053163 A1 * | 3/2007 | Thompson et al. | 361/704 |
| 2007/0200551 A1 * | 8/2007 | Muraki et al. | 324/127 |
| 2008/0049476 A1 * | 2/2008 | Azuma et al. | 363/131 |
| 2008/0119066 A1 * | 5/2008 | Shimizu et al. | 439/76.1 |
| 2008/0247133 A1 * | 10/2008 | Ito | 361/687 |
| 2008/0266206 A1 * | 10/2008 | Nelson et al. | 345/1.3 |
| 2009/0079058 A1 * | 3/2009 | Conn | 257/691 |
| 2009/0135085 A1 * | 5/2009 | Raby et al. | 343/906 |
| 2009/0183940 A1 * | 7/2009 | Sekine et al. | 180/443 |

* cited by examiner

ELECTRICAL CENTER WITH VERTICAL POWER BUS BAR

BACKGROUND OF THE INVENTION

This invention relates to electrical center and more particularly to an electrical center that has a circuit board and a power bus bar.

U.S. Pat. No. 5,032,752 issued to Gary C. Detter et al. Jun. 11, 1991 discloses an electrical distribution center for a vehicle electrical system that includes stacked circuit arrays of varying current capacity located between an upper housing and a lower housing each having terminal access holes for receiving terminals formed on pre-stamped metal circuit elements. The electrical terminals are selectively connected to either electrical or electronic devices carried on top of the upper housing or to wiring connectors connected to the outer surface of the lower housing. The pre-stamped metal circuit elements are removably mounted in recesses in a plurality of stacked electrical insulation boards supported within the lower housing.

The electrical distribution center includes a power bus that includes an ear portion that is adapted to be connected to a battery cable. The power bus is a stamped plate of electrically conductive material that has a plurality of high capacity male terminals that supply power to one side of respective high capacity fuses, the other sides of which are connected to various electrical circuits of the vehicle via the wiring connectors. The stamped plate of the power bus is sandwiched between electrical/insulting boards. See also U.S. Pat. No. 6,077,102 issued to James William Borzi et al. Jun. 20, 2000.

U.S. Pat. No. 7,215,555 issued to Kouichi Takagi May 8, 2007 discloses an electrical distribution center for a vehicle in which a bus bar structure plate has a mounting region as shown in FIG. 1. The mounting region is adhered to the bottom of a control circuit board as shown in FIG. 5. Electronic devices are then mounted on the bus bar structure plate through holes in the control circuit board as shown in FIGS. 6 and 7. Terminal portions are then bent up from the structure plate as shown in FIG. 8 and the bus bar structure plate is then severed at several locations as shown in FIG. 2A or 2B or 2C to form a circuit body structure which is then installed in a case as shown in FIG. 9.

The electrical centers illustrated in the patents discussed above are both characterized by a power bus bar that lies flat against a circuit board. The power bus bars generate heat during use which must be dissipated in some fashion through conduction, radiation and/or convection. In some instances dissipation of the heat generated by the power bus bars does not require any special consideration. However, in other instances, dissipation of the heat generated by the bus bars can require special measures. For instance, the electrical center disclosed in U.S. Pat. No. 7,215,555 issued to Kouichi Takagi incorporates a large aluminum heat sink to dissipate heat as shown in FIG. 10 of the patent.

SUMMARY OF THE INVENTION

The electrical center of this invention has a power bus bar that is configured, oriented and located to reduce the foot print of the electrical center and/or improve the dissipation of heat generated by the electrical center.

In one aspect the power bus bar comprises one or more generally planar straps that are attached to a circuit board in a vertical or upright position thus reducing the space requirements on the printed circuit board and consequently the foot print of the electrical center.

In another aspect the power bus bar comprises one or more generally planar straps that are attached to a circuit board in a vertical or upright position to increase heat transfer from the circuit board and electrical components on the circuit board to the power bus bar and to increase heat transfer from the power bus bar to the electrical center housing.

The power bus bar may be sized to reduce its heating resistance, $I^2R$, so that the bus bar acts as a heat sink for the circuit board and the electrical components carried on the circuit board.

The power bus bar is preferably located so that it extends upwardly away from the circuit board to take advantage of heat rise.

The power bus bar is preferably fabricated from a copper alloy material that has high conductivity both thermally and electrically where the minimum electrical conductivity is 90% (IACS). Copper Alloy INS C15100 per ASTM B747 or similar material is the preferred bus bar material.

DETAILED DESCRIPTION OF PREFERRED EMBODIMENTS

Figure 1:
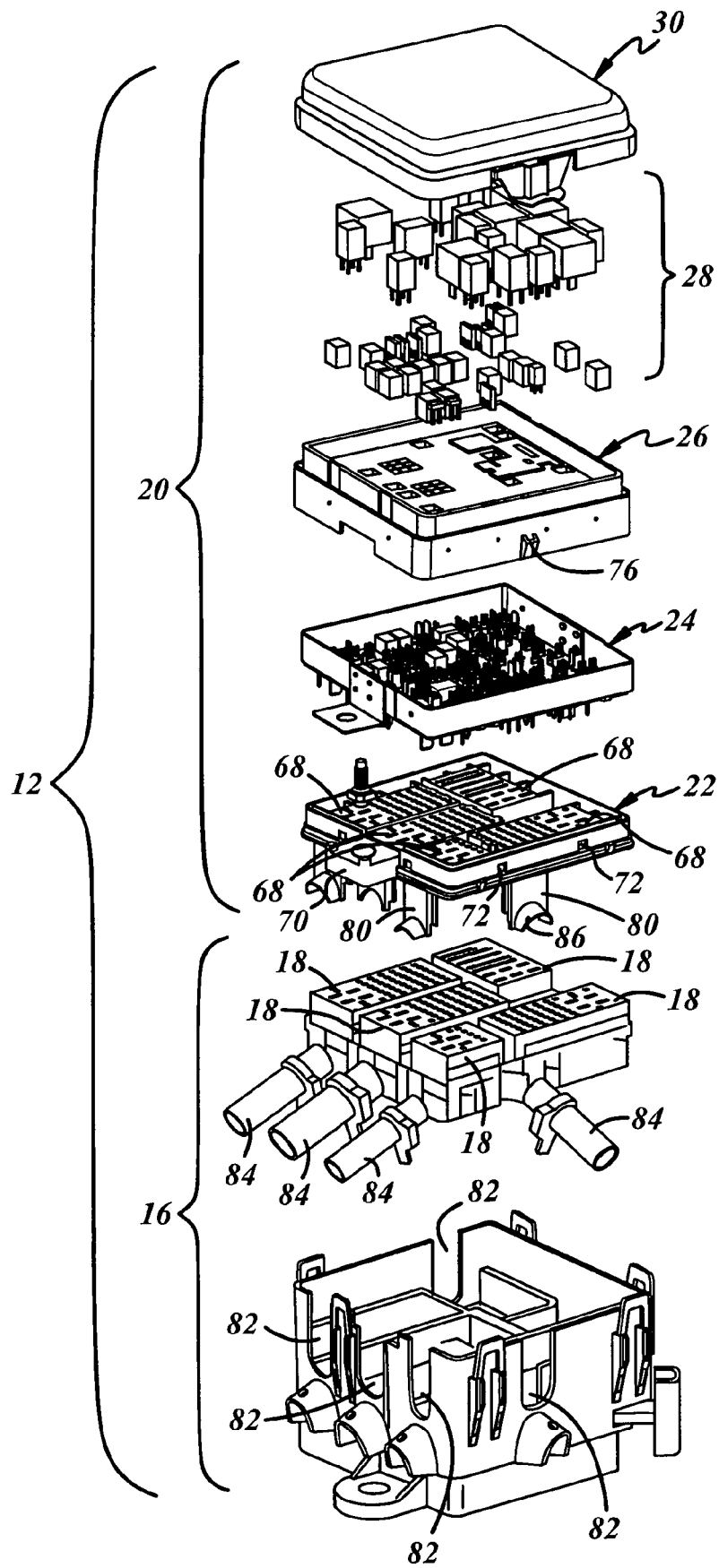
FIG. 1 is an exploded perspective view of an electrical center illustrating an embodiment of the invention.
Figure 2:
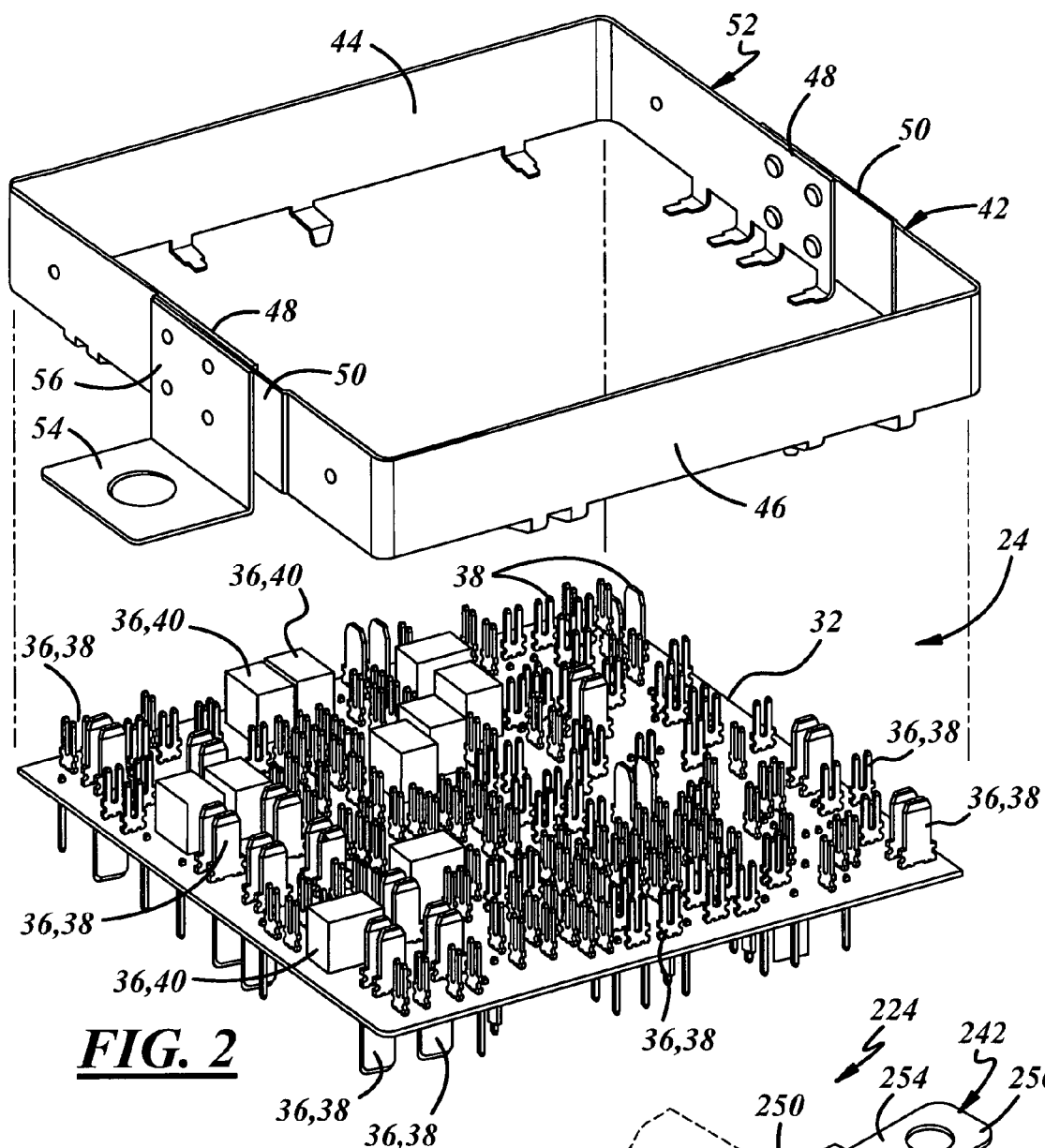
FIG. 2 is an exploded perspective view of a circuit board sub-assembly in the electrical center illustrated in FIG. 1.

Referring now to FIG. 1, an electrical assembly 12 comprises a mounting bracket lift assembly 16 and an electrical center 20. The electrical center 20 is attached to the mounting bracket lift assembly 16 which has means for lifting wiring harness end connectors 18 or the like and plugging the end connectors 18 into electrical sockets of the electrical center 20. The mounting bracket lift assembly 16 is disclosed in detail in a companion patent application Ser. No. 12/228,447 being filed concurrently herewith and is hereby incorporated in this patent application by reference.

The electrical center 20 which may be used independently of the mounting bracket lift assembly 16, comprises a lower housing 22, a circuit board sub-assembly 24, an upper housing 26, electrical components 28 such as fuses and relays that plug into the upper housing 26 and a cover 30.

Referring now to FIGS. 2, 3, 4 and 5, the circuit board sub-assembly 24 includes a circuit board 32 having a substrate 34 which carries electrical traces shown representatively at 35 and circuit components 36, such as pass through connectors 38 of various types that pass through slots of the circuit board, and surface mounted electric and/or electronic devices 40 that are electrically connected to each other in a predetermined way to provide parts of various electrical circuits in a vehicle when the electrical center 20 is installed in the vehicle.

Circuit boards are well known in the art and need not be described in detail. However, it should be noted that many electric and/or electronic devices are heat temperature limited which means that a particular electric or electronic device cannot operate effectively above a certain ambient temperature environment. For instance, such devices when packaged into electrical centers need to effectively dissipate power or sink heat within their respective circuit thus allowing the device to remain under its inherent temperature limit. When the ambient temperature environment is high e.g. a vehicle's engine compartment, device temperature limits are closer to the ambient temperature. Additional heat dissipation via the power bus bar attachment to the printed circuit board may then be required to maintain reliable electrical circuit function.

Figure 3:
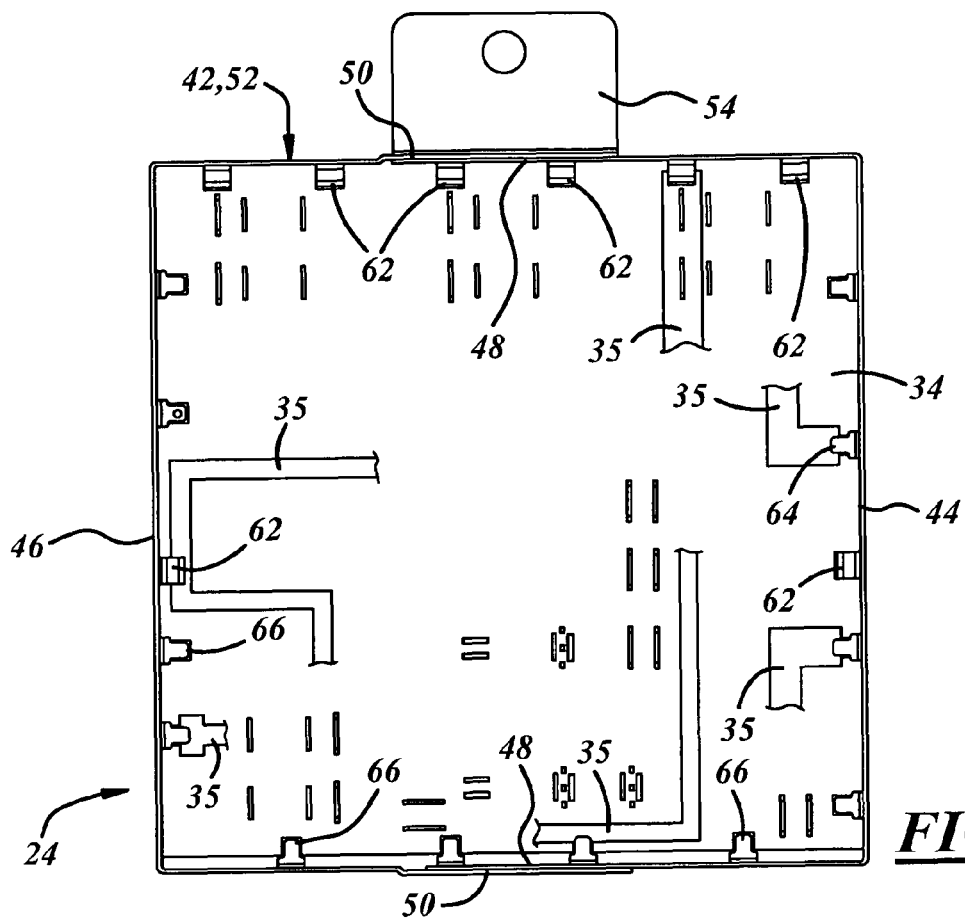
FIG. 3 is a top view of the circuit board sub-assembly shown in FIG. 2.

The circuit board sub-assembly 24 further includes a power bus bar 42 that provides a power input path for the various electrical circuits of the vehicle via the circuit components carried on the circuit board 32. The power bus bar 42 comprises two U-shaped metal straps 44, 46 that are connected to each other at overlapping free ends 48, 50 of the metal straps 44, 46 to provide a rectangular or square shell 52. The free ends 50 of the U-shaped metal strap 46 are offset laterally corresponding to the minimum thickness of the metal straps, so as to receive the free ends 48 of the U-shaped metal strap 44 inside the offset ends 50 of metal strap 46 as best shown in FIG. 3.

The power bus bar 42 further includes an L-shaped metal power attachment tab 54 that has a vertical leg 56 that is attached to the overlapping free ends 48, 50 of the metal straps 44, 46 on one side of the square shell 52. The second horizontal leg 58 extends outward of the square shell 52. A battery bolt 60 (FIG. 1) is attached to the second leg 56 for connecting the power bus bar 42 to a vehicle battery by a battery cable (not shown).

Figure 4:
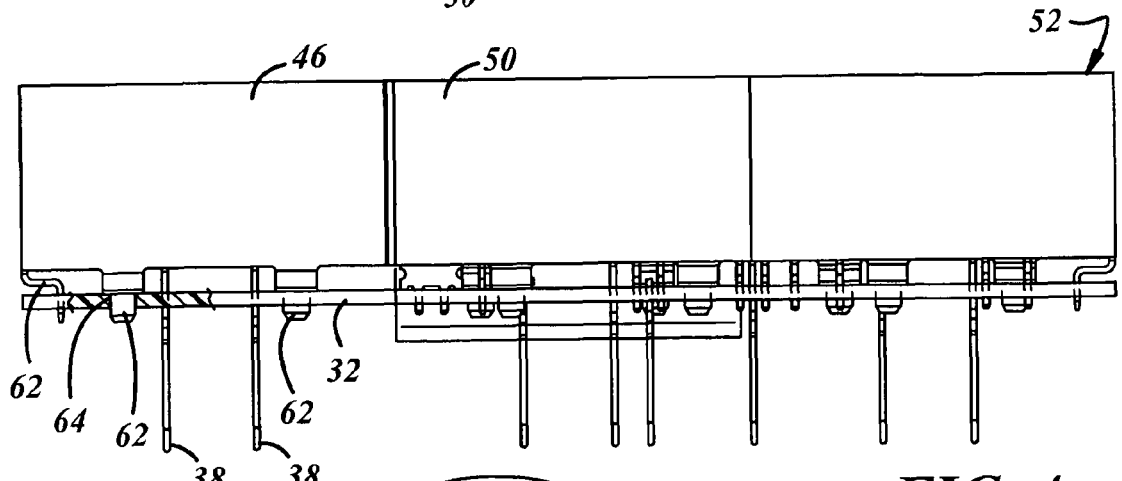
FIG. 4 is a front view of the circuit board sub-assembly shown in FIG. 3.

The power bus bar 42 in the form of a square shell 52 is attached to the periphery of the circuit board 32 so that the straps 44, 46 are vertical or upright that is, the straps 44, 46 substantially perpendicular to the circuit board 32 in the direction of their minimum thickness. The metal straps 46, 48 of the power bus bar 42 are attached by depending push through tabs 62 that are force fit in slots 63 of the circuit board 32 as best shown in FIG. 4. Slots 64 may be clad or unclad. The clad slots are clad with a conductive material, such as copper or copper alloy, that is integrally connected to an electrical trace, conventionally of the same material. Tabs 62 that are force fit in clad slots thus make electrical connections as well as mechanical connections with the circuit board 32. Tabs 62 may be soldered in the clad slots for enhanced electrical and mechanical connection. On the other hand tabs that are disposed in unclad-slots 64 merely provide a mechanical connection for the power bus bar 42.

Tabs 62 are preferably S-shaped to locate the square shell 52 of the power bus bar 42 at or outwardly of the edge of the circuit board 32. The upper parts of tabs 62 are also preferably wider to provide shoulders 64 to engage the circuit board 32 and space the square shell 52 of the power bus bar 42 away from the upper surface of the circuit board 32 to reduce heat transfer from the power bus bar 42 to the circuit board 32.

The rectangular or square shape of the shell 52 along with its attachment to the periphery of the circuit board 32 provides several advantages. The power bus bar 42 may be electrically connected to the circuit board anywhere along the periphery of the circuit board thus enabling considerable design freedom for laying out the electrical traces and circuits on the circuit board. Moreover the length of the traces for the high current power paths to the various electrical and or electronic devices carried by the circuit board can be shortened.

Figure 5:
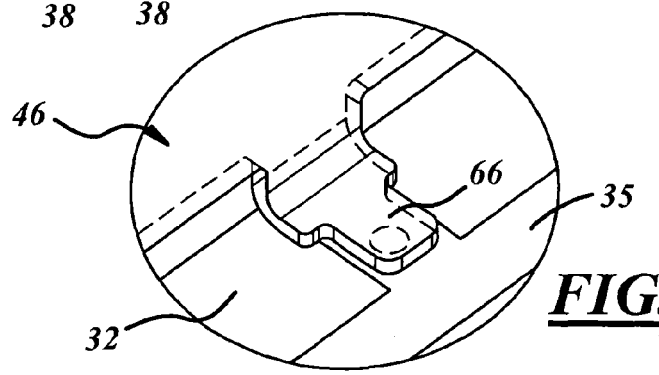
FIG. 5 is a perspective view of a detail of circuit board sub-assembly shown in FIG. 3.

The power bus bar 42 may also include depending surface mount feet 66 for electrical connection to contact pads that form part of one of the electrical traces 35 on the circuit board 32 as best shown in FIG. 5. The surface mount feet are also preferably shaped to space the power bus bar 42 away from the upper surface of the circuit board 32.

Figure 6:
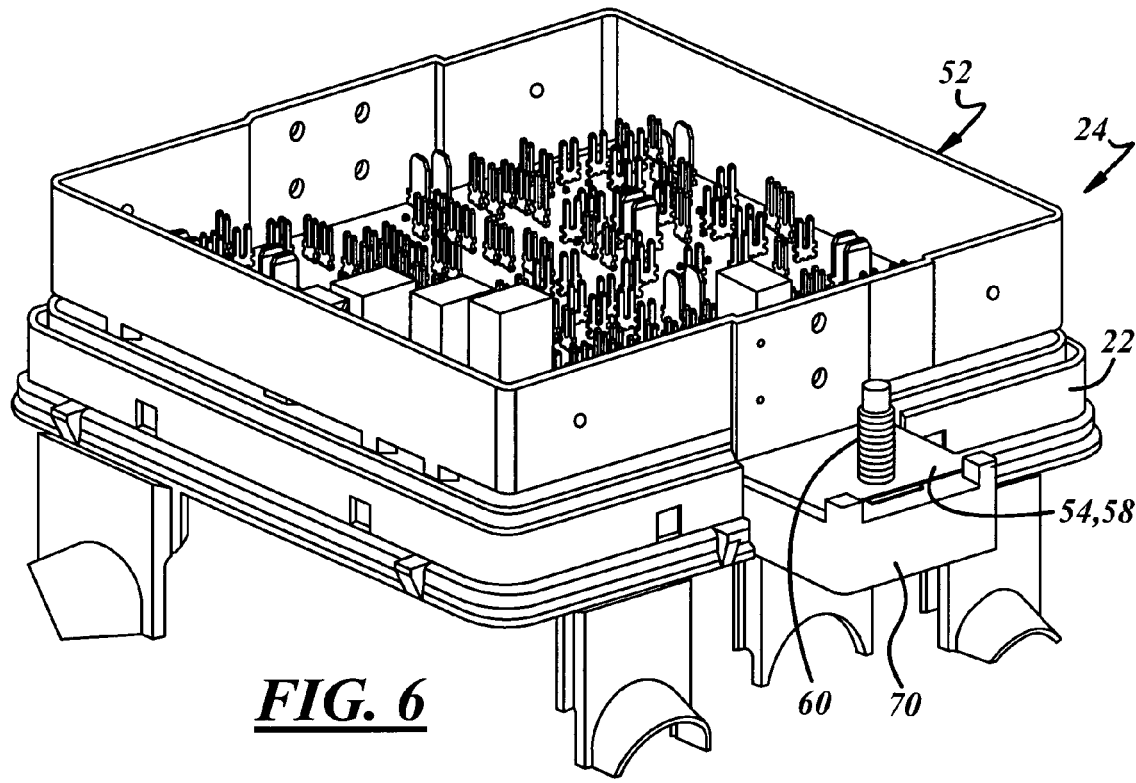
FIG. 6 is a perspective view of the circuit board sub-assembly installed in a lower housing of the electrical center.
Figure 7:
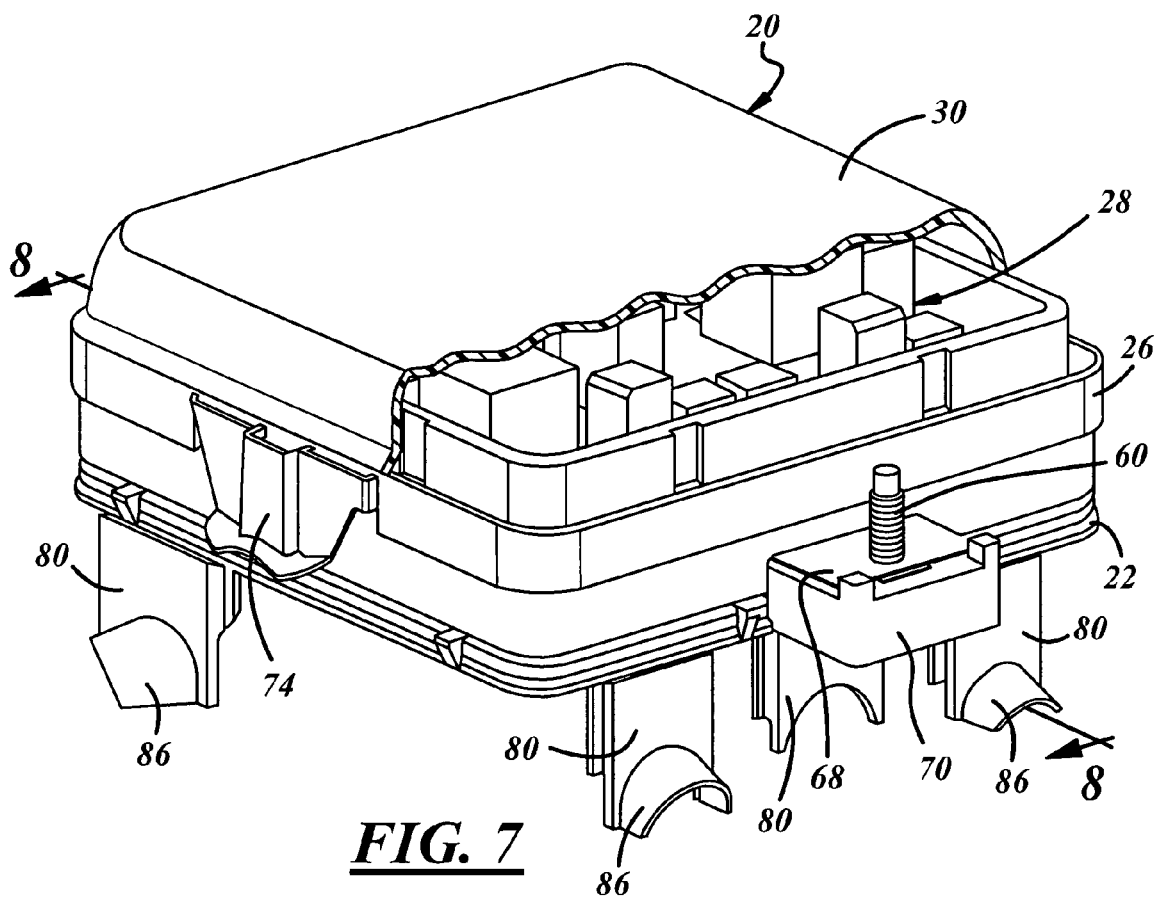
FIG. 7 is a partially sectioned, perspective view of the electrical center.

Referring now to FIGS. 1 and 6, the circuit board sub-assembly 24 is placed in a shallow cavity of the lower housing 22 on top of various integral sockets 68 that are molded as part of the lower housing 22. When the sub-assembly 24 is assembled to the lower housing 22, the pass through connectors 38 carried by the circuit board 32 project through slots and into the various integral sockets 68 that have lower open ends for receiving plug-in portions of the wiring harness 15 as best shown in FIG. 1. The horizontal leg 58 that carries the battery bolt 60 also projects laterally through a shallow slot and rests on an external support 70 of the lower housing 22 that is outside the shallow cavity that receives the circuit board 32. The upper housing 26 is then assembled to the lower housing 22 to cover the circuit board sub-assembly 24 while leaving the horizontal leg 58 of the power attachment tab 54 and the battery bolt 60 exposed. The upper housing 26 is fastened to the lower housing 22 by internal lock nibs (not shown) engaging in lock slots 72 of the lower housing 22. Lock slots 72 are shown in FIG. 1 and covered in FIGS. 7 and 8.

Relays and fuses 28 are then plugged into the upper housing 26 and covered by cover 30. Cover 30 is fastened to upper housing 26 by lock arms 74 on opposite sides of the cover 30 that engage cooperating lock nibs 76.

Figure 8:
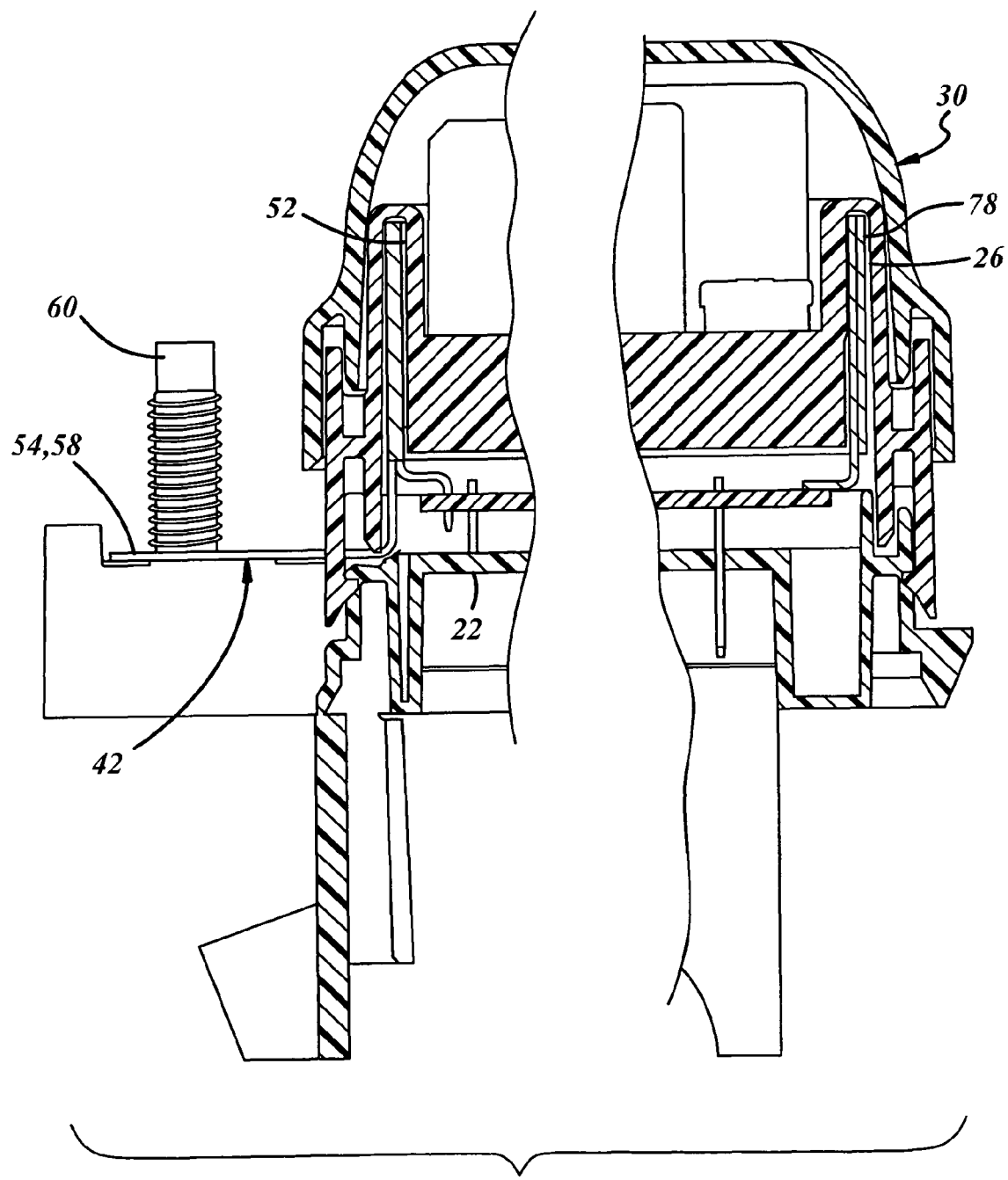
FIG. 8 is a section taken substantially along the line 8-8 of FIG. 7 looking in the direction of the arrows.

The upright or vertical orientation of the power bus bar 42 increases heat transfer from the circuit board 32, particularly the substrate 34 and the electric and or electronic components carried by the circuit board 32 which is often heat limited, to the power bus bar 42 while increasing heat transfer from the power bus bar 42 to the upper housing 26 as well as the lower housing 22 and cover 30 by conduction, connection and radiation. Moreover, heat transfer from the circuit board 32 and the electric and/or electronic components carried on the circuit board is preferably enhanced by spacing the power bus bar 42 away from the edge of the circuit board. This spacing also facilitates locating a substantial portion of the power bus bar 42 between portions of the upper plastic housing 26 as best shown in FIG. 8. As noted in FIG. 8, the upper plastic housing 26 preferably has an internal peripheral channel 78 that receives the square shell 52 of the power bus bar 42 when the upper plastic housing 26 is attached to the lower plastic housing 22.

The lower plastic housing 22 preferably has optional depending tongues 80 along its periphery when the electrical center 20 is used with the mounting bracket lift assembly 16 to close the upper portions of the loading slots 82 of the mounting bracket lift assembly 16 through which the wiring harnesses 84 attached to the end connectors 18 exit the mounting bracket lift assembly 16. These depending tongues 80 may include hoods 86 at their free ends to assist in preventing dirt and other undesirable matter from entering into the mounting bracket lift assembly 16 through the loading slots 82.

Figure 9:
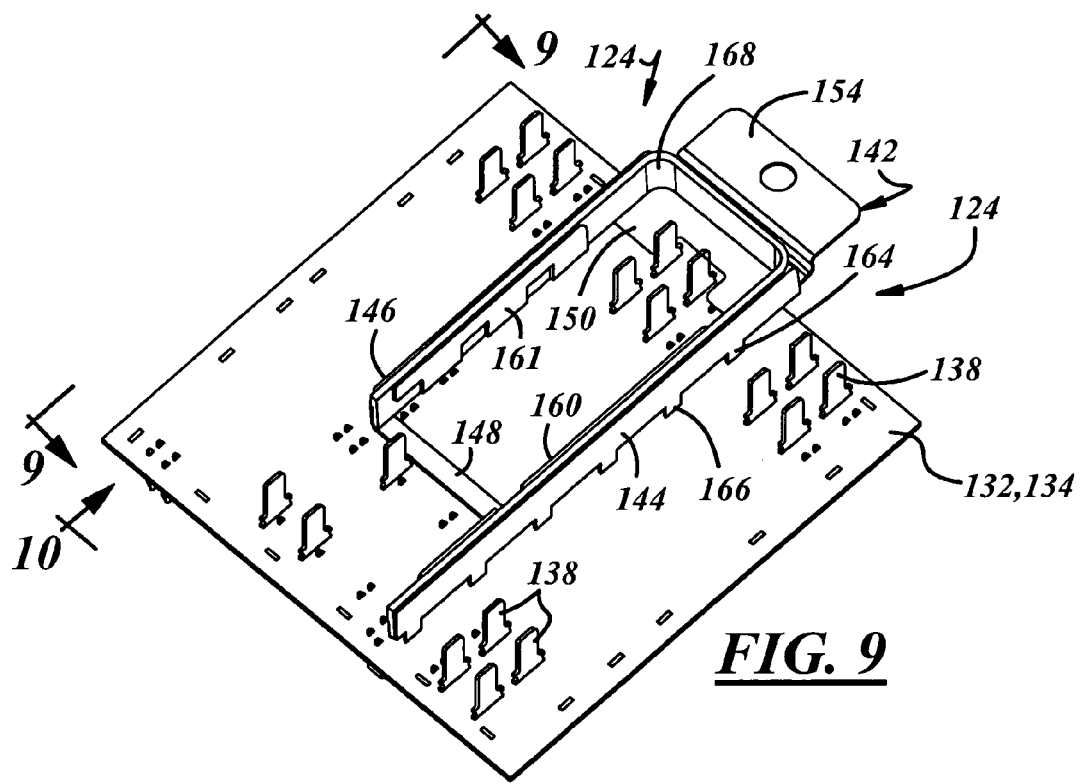
FIG. 9 is a perspective view of an alternate circuit board sub-assembly.
Figure 10:
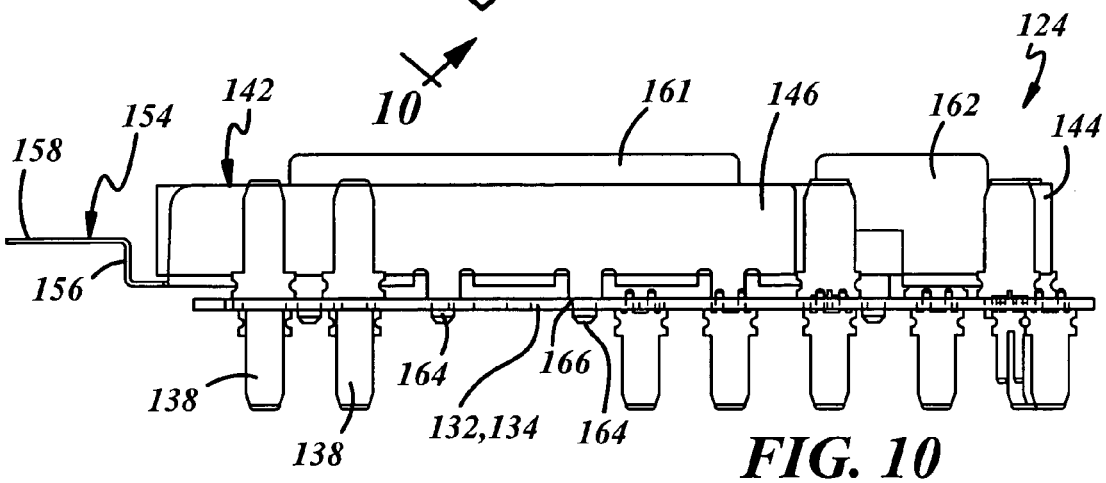
FIG. 10 is a side view of the alternate circuit board sub-assembly of FIG. 8.
Figure 11:
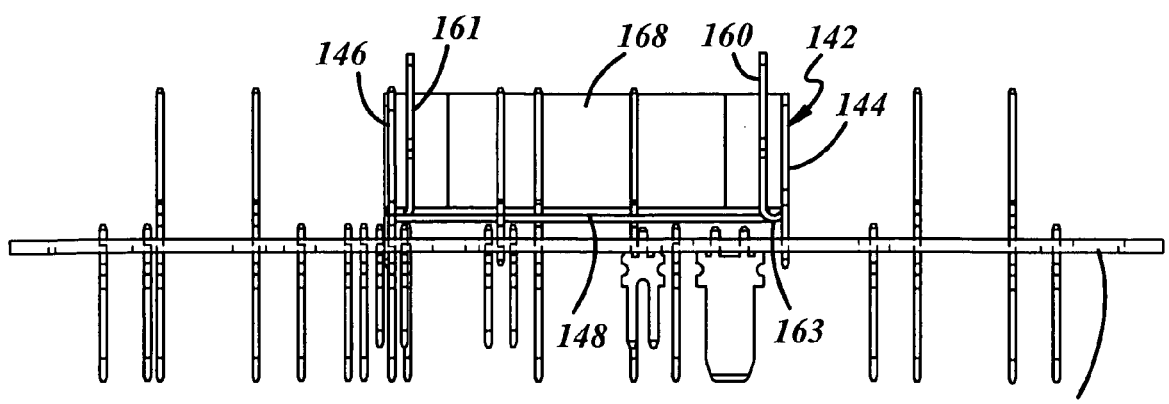
FIG. 11 is a front view of the alternate circuit board sub-assembly of FIG. 8.

Referring now to FIGS. 9, 10 and 11, an alternate circuit board sub-assembly 124 embodying the invention is illustrated. Circuit board sub-assembly 124 comprises a circuit board 132 having a substrate 134 which carries circuit components 136, such as pass through connectors 138 and surface mounted electronic devices (not shown) that are electrically connected to each other in a predetermined way to provide parts of various electrical circuits in a vehicle when the electrical center 20 is installed in the vehicle.

The circuit board sub-assembly 124 further includes a power bus bar 142 that provides a power path for the various electrical circuits of the vehicle via the circuit components carried on the circuit board 132. The power bus bar 142 is of one-piece construction and generally U-shaped with two flat metal straps 144, 146 that are connected to each other by perpendicular bridges 148, 150 attached to edges of the respective straps, 144, 146. Bridge 150 which is located at one end of the power bus bar 142 has an L-shaped metal tab 154 at an outer end of the power bus bar 142. Tab 154 has a vertical leg 156 and a horizontal leg 158 that extends outward away from the tines 144, 146. Battery bolt 60 may be attached to the horizontal leg 158 for connecting the power bus bar 142 to a vehicle battery by a battery cable (not shown).

Parallel straps 160, 161 may be juxtaposed portions of metal straps 144, 146 respectively and connected thereto by bight portions 162 that provide narrow troughs 163. The metal straps 146, 148 of the power bus bar 142 are attached to circuit board 132 by depending push through tabs 164 that are force fit in slots 166 of the circuit board 132 as best shown in FIGS. 9 and 10. Tabs 164 like tabs 62 are preferably wider at the top to provide shoulders 166 to engage the circuit board 132 and space the power bus bar 142 away from the upper surface of the circuit board 132.

The power bus bar 142 may include a U-shaped aluminum heat sink 168 that is carried by the troughs 163 formed by the straps 144, 146 connected to the respective straps 160, 161 by bight portion 162.

Figure 12:
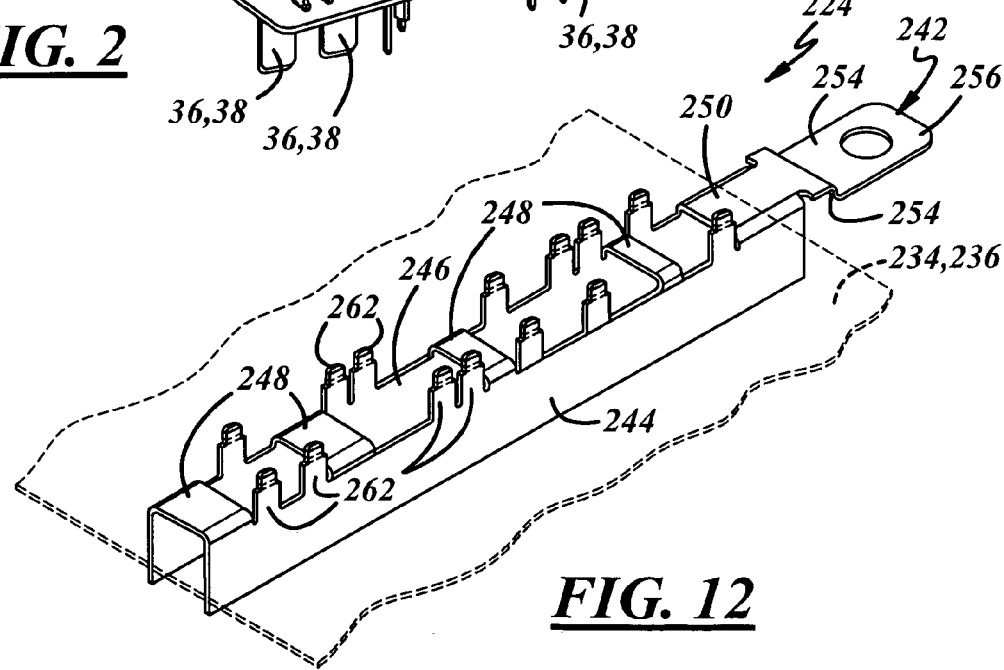
FIG. 12 is a perspective view of another alternate circuit board sub-assembly.

Referring now to FIG. 12, another alternate circuit board sub-assembly 224 embodying the invention is illustrated. Circuit board sub-assembly 224 comprises a circuit board 232 having a substrate 234 which carries circuit components, such as pass through connectors and surface mounted electronic devices (now shown) that are electrically connected to each other in a predetermined way to provide parts of various electrical circuits in a vehicle when the electrical center 20 is installed in the vehicle.

The circuit board sub-assembly 224 further includes a power bus bar 242 that provides a power input for the various electrical circuits of the vehicle via the circuit components carried on the circuit board 232. The power bus bar 242 is of one-piece construction and generally U-shaped with two flat metal straps 244, 246 that are connected to each other by several bridges 248, 250 attached to edges of the respective straps 244, 246. Bridge 250 which is located at one end of the power bus bar 242 has an L-shaped metal power attachment tab 254 at an outer end of the power bus bar 242. Tab 254 has a vertical leg 256 and a horizontal leg 258 that extends outward away from the straps 244, 246. Battery bolt 60 may be attached to the horizontal leg 258 for connecting the power bus bar 242 to a vehicle battery by a battery cable (not shown).

The metal straps 246, 248 of the power bus bar 242 are attached by several push through tabs 262 that are force fit in slots of the circuit board 232. Tabs 262 like tabs 62 and 164 are preferably wider at the top to provide shoulders 264 to engage the circuit board 232 and space the power bus bar 242 away from the upper surface of the circuit board 232.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalent hereof.

We claim:

1. An electrical center comprising:
    a circuit board assembly including a circuit board having a substrate that carries electrical traces and electric and/or electronic components and a plurality of slots; and
    a power bus bar having a generally planar metal strap that is attached to the circuit board so that the generally planar metal strap is substantially perpendicular to the circuit board, and the metal strap includes a plurality of depending S-shaped connector tabs that extend through at least a portion of the plurality of slots to attach the power bus bar to the circuit board,
    wherein the power bus bar surrounds at least a majority portion of the electric and/or electronic components of the circuit board being disposed along at least two edges of the circuit board, and the power bus bar further comprises a plurality of surface mount feet in electrical communication with said electrical traces disposed on the substrate, said feet further being configured to provide support for the power bus bar when attached to the substrate and ensure the power bus bar is spaced apart from the substrate.

2. The electrical center as defined in claim 1 wherein the generally planar strap of the power bus bar is sized to act as a heat sink for the circuit board assembly when the heating resistance I2R of the power bus bar is taken into account.

3. The electrical center as defined in claim 2 wherein the generally planar strap of the power bus bar extends upwardly away from the circuit board to take advantage of heat rise.

4. The electrical center as defined in claim 1 wherein the S-shaped connector tabs have shoulders engaging the circuit board to space the power bus bar from an adjacent surface of the circuit board, and said shoulders are disposed on the S-shaped connector tabs remote from at least one edge of the power bus bar.

5. The electrical center as defined in claim 1 wherein the metal strap of the power bus bar comprises a plurality of generally planar metal straps.

6. The electrical center as defined in claim 5 wherein the plurality of generally planar metal straps includes a first pair of substantially parallel metal straps that are connected to each other by at least one bridge.

7. The electrical center as defined in claim 6 wherein the first pair of substantially parallel metal straps have inner edges adjacent the circuit board and wherein the at least one bridge is disposed at the inner edges of the first pair of substantially parallel straps.

8. The electrical center as defined in claim 6 wherein the first pair of substantially parallel straps are connected to a second pair of substantially parallel straps.

9. The electrical center as defined in claim 8 wherein the first pair of substantially parallel straps have opposite ends that are connected by the second pair of substantially parallel straps to provide a rectangular arrangement.

10. The electrical center as defined in claim 9 wherein the circuit board has a plurality of slots and the first pair of substantially parallel straps and the second pair of substantially parallel straps have a plurality of depending connector tabs that connect the parallel straps to the circuit board, the connector tabs having shoulders engaging the circuit board to space the straps from an adjacent surface of the circuit board.

11. The electrical center as defined in claim 10 wherein the first set of substantially parallel straps have straps of equal length and the second set of substantially parallel straps have straps of the same equal length as the first set of substantially parallel straps to provide a square arrangement.

12. The electrical center as defined in claim 1 wherein the electrical center is combined with a mounting bracket lift assembly, the electrical center including a plurality of electrical connector sockets, and the mounting bracket lift assembly carrying a plurality of electrical connectors, the electrical center being connected to the mounting bracket lift assembly and the mounting bracket lift assembly having means for lifting the electrical connectors into engagement with the electrical connector sockets.

13. An electrical center comprising:
 a circuit board assembly including a circuit board; and
 a power bus bar containing,
  a plurality of generally planar, electrically conductive straps attached to the circuit board substantially perpendicular to the circuit board; and
  an attachment tab adapted for electrical connection to an external power source,
  wherein each electrically conductive strap in said plurality of electrically conductive straps is joined together by said attachment tab, and
 wherein at least one of the plurality of electrically conductive straps includes a trough that carries a heat sink thereon.

14. The electrical center as defined in claim 13 wherein the power bus bar comprises depending S-shaped connector tabs that engage the circuit board to mount the power bus bar to the circuit board.

15. The electrical center as defined in claim 14 wherein the S-shaped connector tabs have shoulders that engage the substrate so that the power bus bar has a spaced apart relationship from the circuit board, wherein said shoulders are disposed on the S-shaped connector tabs remote from an edge of the power bus bar.

16. The electrical center as defined in claim 13 wherein the plurality of electrically conductive straps comprise a plurality of U-shaped electrically conductive straps.

17. The electrical center as defined in claim 16 wherein the circuit board includes a surface area and said plurality of U-shaped electrically conductive straps comprise a pair of U-shaped electrically conductive straps, the pair of U-shaped electrically conductive straps being attached to one another in a manner such that the pair of U-shaped electrically conductive straps surround at least a portion of the surface area of the circuit board.

18. The electrical center as defined in claim 13 further including,
 a housing,
 wherein at least one of the plurality of electrically conductive straps is disposed in the housing and the attachment tab is disposed external to the housing being connected to the external power source.

19. The electrical center as defined in claim 18 wherein the housing has at least one peripheral channel, and said at least one peripheral channel receives the at least one of the electrically conductive straps.

20. The electrical center as defined in claim 13, wherein the power bus bar is formed of a single unitary piece.

21. The electrical center as defined in claim 13, wherein the power bus bar further includes,
 at least one bridge that electrically connects to each electrically conductive strap in the plurality of electrically conductive straps, said at least one bridge being disposed on the power bus bar remote said attachment tab.

22. The electrical center as defined in claim 13, wherein the plurality of electrically conductive straps have a parallel, spaced relationship.

23. The electrical center defined in claim 22, wherein the plurality of electrically conductive straps include a first and a second electrically conductive straps and the attachment tab is disposed intermediate the first and the second electrically conductive straps.

24. The electrical center as defined in claim 17, wherein said pair of U-shaped conductive straps surround a substantial portion of the surface area of the circuit board.

* * * * *